United States Patent
Behr et al.

(10) Patent No.: US 6,627,312 B1
(45) Date of Patent: Sep. 30, 2003

(54) REINFORCING FIBERS AND FIBER BUNDLES, ESPECIALLY FOR FIBER COMPOSITES, METHODS FOR THE PRODUCTION THEREOF, AND A FIBER COMPOSITE HAVING REINFORCING FIBERS

(75) Inventors: Thomas Behr, Elchingen (DE); Gerd Dietrich, Burgrieden (DE); Tilmann Haug, Uhldingen-Mühlhof (DE); Kolja Rebstock, Ulm (DE); Christian Schwarz, Ulm (DE); BJörn Spangemacher, Ulm (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/647,822

(22) PCT Filed: Mar. 11, 1999

(86) PCT No.: PCT/EP99/01577

§ 371 (c)(1),
(2), (4) Date: Jun. 11, 2001

(87) PCT Pub. No.: WO99/51539

PCT Pub. Date: Oct. 14, 1999

(30) Foreign Application Priority Data

Apr. 6, 1998 (DE) .......................................... 198 15 308

(51) Int. Cl.⁷ ................................................. B32B 9/00
(52) U.S. Cl. ...................... 428/367; 428/408; 428/375; 428/391; 428/359; 428/361; 428/364; 428/366; 428/368; 428/378; 428/380; 428/381; 428/389; 428/401
(58) Field of Search ................................ 428/101, 245, 428/367, 408, 329, 375, 391, 359, 361, 364, 366, 368, 378, 380, 381, 389, 401, 292.1

(56) References Cited

U.S. PATENT DOCUMENTS 4,275,095 A * 6/1981 Warren ........................ 427/228
4,397,901 A * 8/1983 Warren ........................ 428/101

* cited by examiner

Primary Examiner—Merrick Dixon
(74) Attorney, Agent, or Firm—Crowell & Moring LLP

(57) ABSTRACT

A reinforcing fiber, in particular for fiber composite materials, has a core which is provided with a layer of a pyrolysable binder. A coating of pyrolytic carbon or sugar is provided between the core and the layer fiber strands are provided with reinforcing fibers of this type and fiber strands are coated in this way. Fiber composite materials can be prepared with these reinforcing fibers. Processes for producing reinforcing fibers and composite materials involve coating fiber strands.

24 Claims, 3 Drawing Sheets

REINFORCING FIBERS AND FIBER BUNDLES, ESPECIALLY FOR FIBER COMPOSITES, METHODS FOR THE PRODUCTION THEREOF, AND A FIBER COMPOSITE HAVING REINFORCING FIBERS

CROSS-REFERENCE TO RELATED APPLICATIONS

This application is the national phase filing of PCT/EP99/01577 filed Mar. 11, 1999, which claims priority to German Patent Application 198 15 308.2 filed Apr. 6, 1998, which applications are herein expressly incorporated by reference.

BACKGROUND OF THE INVENTION

The invention relates to reinforcing fibres, in particular for fibre composite materials, their use, a process for their production, as well as a fibre composite material with reinforcing fibres based on carbon and to a process for its production.

Reinforcing fibres and fibre composite materials of the generic type are disclosed by German Patent Application 197 11 829.1, which is not a prior publication. The reinforcing fibres known from the latter are high-temperature resistant fibres in the form of short fibre strands. The fibre strands are impregnated with a binder suitable for pyrolysis. For this purpose, the fibre strands are immersed in the binder. The binder is subsequently made to set. Consequently, the fibre strands are held together and mechanically reinforced. The fibre strands are mixed with further binders and fillers, and the mixture is pressed to form a green compact, which is subsequently pyrolysed under a vacuum or inert gas to form a porous moulding. The fibre strands are thereby covered with a layer of carbon. The moulding is subsequently infiltrated with a silicon melt. This produces a C/SiC fibre composite material in which the fibre strands are embedded in an SiC-based matrix. The short fibre strands are embedded in a randomly distributed manner in the matrix, the individual filaments being largely retained. The coating of carbon has fully or partially reacted with the matrix material. As a result, the fibre strands are protected against the aggressive attack of the silicon melt. This fibre composite ceramic displays very good tribological properties and, in addition, is relatively inexpensive and simple to produce. It is suitable in particular for the production of brake discs and/or brake linings.

However, this material cannot withstand extremely high mechanical stresses, as occur for example as a result of large vehicle masses or extreme speeds. U.S. Pat. No. 4,397,901 discloses a further composite material with carbon fibres. The fibres are covered with a pyrolytic carbon layer which is then reacted directly with silicon. The finished composite article is then once again CVD-coated, using trichlorosilane with silicon carbide. A separate protective layer for the fibres is not disclosed.

SUMMARY OF THE INVENTION

The object of the invention is therefore to provide a reinforcing fibre and a composite material of the above-mentioned type which offer even higher strength and better quasi-ductility of the component, but nevertheless are easy and inexpensive to produce and are therefore suitable for series production.

Pyrolytic carbon is understood here to mean both a pyrolytic dip coating and a carbon layer deposited from the gas phase.

The reinforcing fibres or fibre strands according to the invention are thus in each case coated with two additional layers. The lower layer, applied directly on the fibre or the fibre strand, is of pyrolytic carbon. Applied to this layer is a dip coating known per se of a pyrolysable binder. These fibres or fibre strands are worked in the way described above into a green compact, which is then pyrolysed to form a porous moulding. During the impregnation of the porous moulding with liquid silicon, the carbon layer originating from the resin coating acts as a "sacrificial layer". The liquid silicon reacts with this outermost layer to form a silicon carbide. This represents a diffusion barrier for the liquid silicon, which consequently cannot penetrate any further into the fibre or fibre strand. The lower-lying layer of pyrolytic carbon and the reinforcing fibres or fibre strands are not attacked. Rather, the layer of pyrolytic carbon acts as a graphitic structure with sliding properties, i.e. the fibre or the fibre strand can slide along on this structure.

The composite materials containing fibres or fibre strands treated in this way are therefore distinguished by very good mechanical properties and particularly high strength. The additional layer of pyrolytic carbon brings about an optimum bonding of the reinforcing fibres to the matrix. They have a crack-diverting effect and can slide in a longitudinally movable manner, which brings about the good results of the strength and three-point bending tests. Fibre pullout effects are possible. This results in very good mechanical properties of the fibre-reinforced composite material.

The use of these reinforcing fibres according to the invention in fibre composite materials, even in small amounts as a proportion of the total fibre volume, allows the values for strength and elongation to be significantly increased, as can be demonstrated for example in the three-point bending test. The remaining parameters are not adversely affected by this.

Thus, if the mechanical loads for the component are extremely high, strength and elongation values can be further increased. In the case of particularly high mechanical stresses, it is possible by the present invention to adapt known processes for the inexpensive production of fibre-reinforced composite ceramic to the extent that the material offers particularly high external strength with significantly increased internal quasi-ductility of the component.

The process for producing the reinforcing fibres according to the invention is distinguished in that carbon fibres are initially coated with pyrolytic carbon. The fibres are subsequently provided with pyrolysable polymer material.

The coating may take place on the one hand by dip coating, for example immersion in a pitch bath. This process is suitable in particular for long fibres or continuous fibres. On the other hand, the coating may take place by depositing on the fibres a carbon layer from the gas phase. An example is CVD coating with hydrocarbons, for example with methane, in a reactor. This process is suitable both for short fibres and for long fibres or continuous fibres.

The use of pitch has the further advantage that crystalline carbon, which reacts much more slowly with liquid silicon than a layer of amorphous carbon, as is produced when using a phenolic resin for example, is produced as the pyrocarbon layer. This further reinforces the diffusion barrier for the amorphous carbon.

A further refinement of the invention provides that the long fibres or endless fibres are cut up after coating and before processing into a green compact.

Fibre bundles treated in the way according to the invention preferably comprise approximately 1000 to 14,000 individual fibres with average diameters of approximately 5 to 10 μm and a length of approximately 10 to 30 mm. In this way, commercially available fibre strands can also be used. This makes low-cost production possible.

All common reinforcing fibres can be used. Carbon fibres are preferred. However, in principle other high-temperature resistant fibres, such as silicon carbide fibres or Si/C/B/N-based fibres are also suitable, as are metal fibres and glass fibres. Titanium fibres and also aramid fibres are well suited.

Very good results are obtained if only fibres treated in this way are used for producing the green compacts. Positive effects can be measured, however, from a fibre content of as low as approximately 10%, in particular approximately 15% as a proportion of the total fibre volume. A content of approximately 40% as a proportion of the total fibre volume of the green compact is particularly preferred. With this proportional content, the cost-benefit ratio is particularly favourable.

From the following detailed description, taken in conjunction with the drawings and subjoined claims, other objects and advantages of the present invention will become apparent to those skilled in the art.

BRIEF DESCRIPTION OF THE DRAWINGS

Exemplary embodiments of the present invention are described in more detail below with reference to the attached drawings, in which.

DETAILED DESCRIPTION OF THE PREFERRED EMBODIMENT

Figure 1:
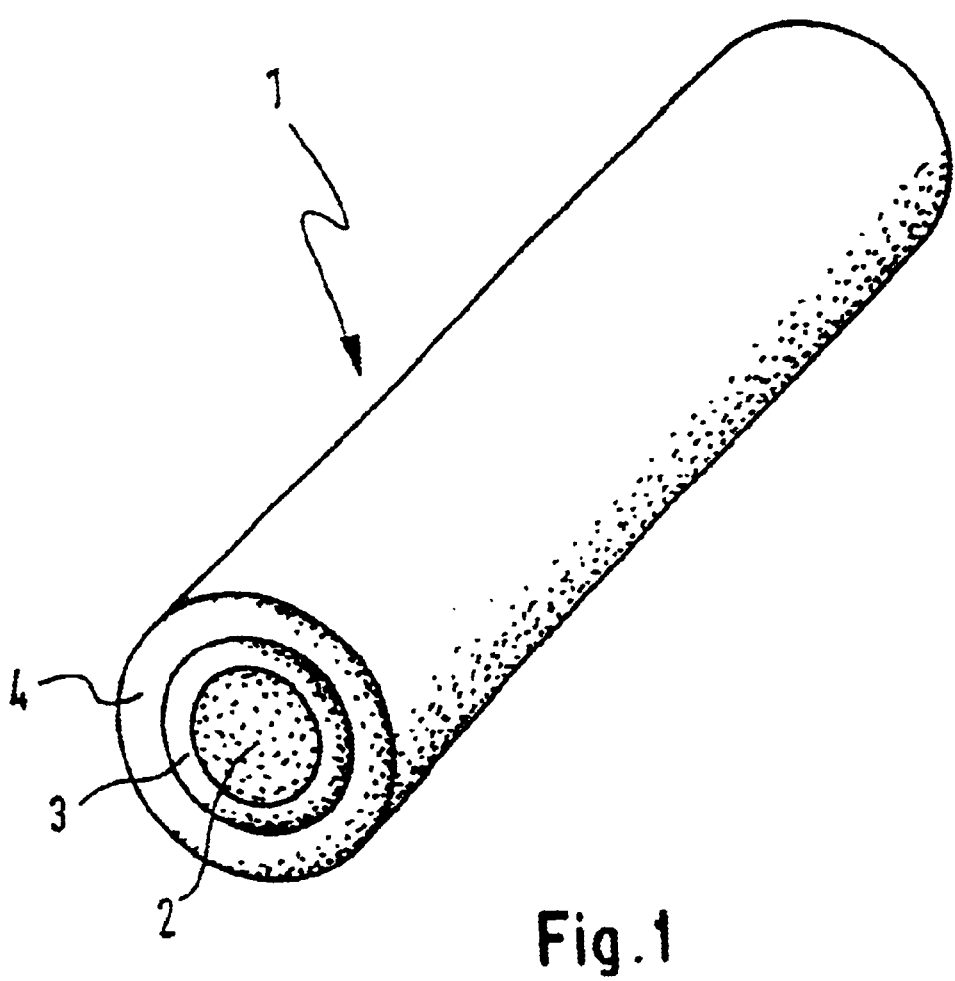
FIG. 1 is a schematic view of a reinforcing fibre according to the invention.

The reinforcing fibre 1 schematically represented in FIG. 1 has an inner core 2 of a carbon fibre. This core 2 is provided with a coating 3 of pyrolytic carbon. The coating 3 is preferably approximately 100–300 nm thick. A preferred pyrolytic carbon is pitch or carbon obtainable by CVD coating from methane.

Applied on the coating 3 is an outer layer 4 of a pyrolysable binder. The layer 4 is preferably approximately 200–800 nm thick. This binder is, for example, a pyrolysable resin or resin mixture, preferably from the group of phenolic resins. The layer 4 is converted into carbon during the later pyrolysis.

The inner region of the reinforcing fibre 1, that is to say the coating 3 of carbon and the core 2 of the reinforcing fibre 1 sheathed by the coating 3, are not attacked by the liquid silicon.

According to the invention, it is provided that, instead of individual reinforcing fibres, entire fibre strands are also provided with two corresponding layers. Fibre strands of this type may comprise approximately 1000 to 14,000 individual fibres (filaments).

Figure 2:
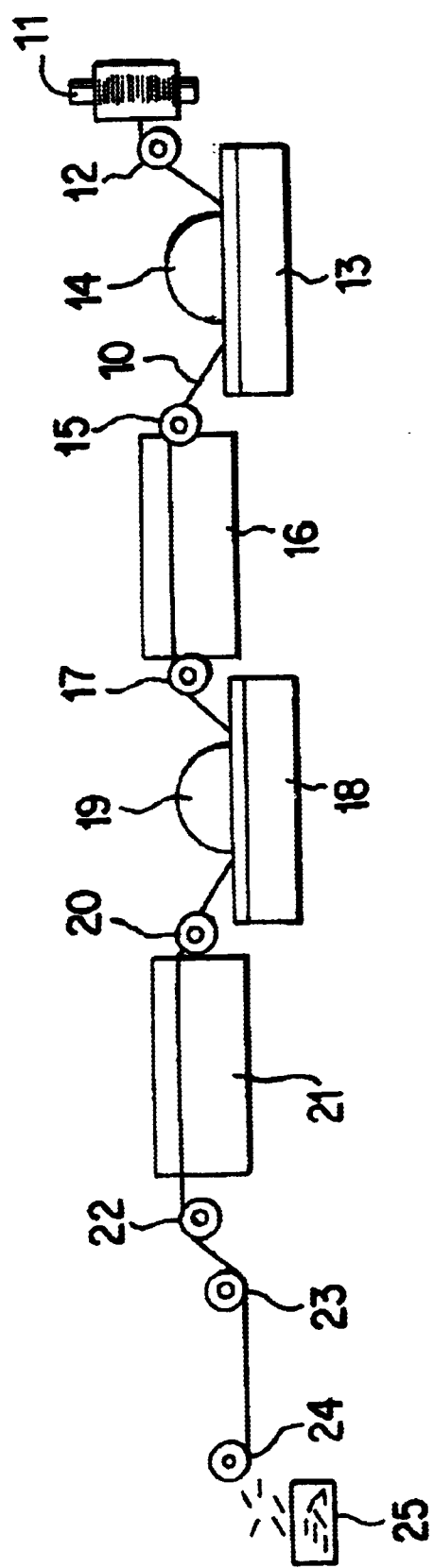
FIG. 2 is a schematic view of an installation for the dip coating of long fibres.

These fibres or fibre strands can be produced in various ways. One possible process is well suited, for example, for the coating of long fibres and is schematically represented in FIG. 2. The long fibres 10 are initially unwound from a reel 11 in an unwinding device and directed into a pitch bath 13 via a deflecting roller 12. The pitch bath may comprise, for example, a pitch solution in 1-methyl-2-pyrrolidone. The long fibres 10 are led via a deflecting roller 14 through the pitch bath 10 and subsequently, with the adhering pitch, are introduced via a further deflecting roller 15 into a drying station 16, and dried there. The drying may take place for example in hot-air countercurrent. During this process, the solvent should be removed as completely as possible.

The long fibres 10 coated in this way are subsequently introduced via a deflecting roller 17 into a coating bath 18. The coating bath 18 contains a diluted phenolic resin solution (phenolic resin in furfuryl alcohol; dilution with 5 to 60% by weight ethanol). The long fibres 10 are led via a deflecting roller 19 through the coating bath 18 and subsequently are introduced, in turn via a deflecting roller 20, into a drying station 21 and are dried there as described.

At the end of the installation there is a cutting unit 24, into which the long fibres 10 are led via deflecting rollers 22 and 23. There, the long fibres 10 are cut into short-fibre strands 25 of the desired length.

further possible process is well suited for the coating of long and short fibres or fibre strands. The fibres or fibre strands are initially subjected in a known way to a CVD coating, for example using methane, and subsequently subjected as described to a dip coating in a bath of pyrolysable phenolic resin.

The fibre composite materials which can be produced with fibres of this type are distinguished by-particularly favourable mechanical properties. The production process for the fibre composite materials is known per se and is described for example in German Patent Application 197 11 829.1.

The mixture for producing the green compacts comprises fibres or fibre strands, of which at least part (preferably approximately 40% by volume) is treated in the way according to the invention, a pyrolysable binder, for example a phenolic resin, and if appropriate carbon-containing fillers such as graphite or carbon black and further fillers such as silicon, carbides, nitrides or borides, preferably silicon carbide, titanium carbide or titanium boride in powder form. Further preferred fillers for influencing the pyrolysis kinetics, in particular for accelerating the pyrolysis, are for example polyvinyl alcohol or methyl cellulose. Furthermore, additives of iron, chromium, titanium, molybdenum, nickel or aluminium may be added to the mixture. These additions improve the behaviour of the liquid silicon during the infiltration.

The baths may also have already been mixed with fillers, such as graphite for example.

The carbon-containing fillers assist cohesion during the production and subsequent pyrolysis of the green compact and accelerate the pyrolysis. The further fillers serve for adjusting the wear resistance of the later composite ceramic.

The green compact may be produced, for example, by hot extrusion. In this case, production of the green compact resembling the final form is possible. Since little shrinkage occurs during the pyrolysis and infiltration with liquid silicon, the reworking effort is small.

The mixture described above may, however, also be mixed with thermocurable binders in a kneader, pressed in this form and cured under heating to form a green compact. In this case, the green compact or the porous moulding resulting from the pyrolysis of the green compact may be re-worked to a desired form. The porosity of the moulding can be adjusted by the choice of added substances and their amount.

Exemplary Embodiment 1

Carbon fibre strands comprising long fibres of the T 800/6K type from the Toray company were coated by soaking in a pitch bath and subsequent drying. The coated fibre strands were then impregnated by immersing in a phenolic resin solution and subsequent drying in a circulated-air cabinet at 130° C. The fibres treated in the way according to the invention were cut to a length of 24 mm. The short-fibre strands thus obtained were processed into a pressed mass. For this purpose, untreated and treated fibre strands comprising fibres of the T 800/6K type from the Toray company of 24 mm length were kneaded with phenolic resin, titanium carbide and graphite as the filler in a mixing kneader to form a pressed mass. The proportional content of fibres coated in the way according to the invention was 38% by volume. The pressed mass was pressed in a die resembling the final form under 80 bar and cured at 150° C. to form a dimensionally stable CRP panel. The pyrolysis took place at 800° C. in a pyrolysis oven under inert gas. The subsequent silicizing was carried out under a vacuum at approximately 1600° C. with a liquid silicon melt. The resulting C/SiC body was cooled down to room temperature.

The three-point bending strength of the body thus obtained was on average 117 MPa with an elongation of 0.47%.

Exemplary Embodiment 2

Carbon fibre strands of the same proportional content of 3 mm long SCF3 short fibres and 6 mm long SCF6 short fibres from the SGL company and T 800/6K fibres from the Toray company of 24 mm length were used. The fibre strands were initially provided as described above with a layer of pyrocarbon and then with a layer of phenolic resin. The fibres treated in the way according to the invention were processed into a pressed mass. For this purpose, untreated and treated fibre strands of the composition described above were used. The proportional content of the fibres coated in the way according to the invention was again 38%. These fibre strands were kneaded with phenolic resin, titanium carbide and graphite as the filler in a mixing kneader to form a pressed compound. The pressed mass was pressed in a die resembling the final form under 80 bar and cured at 150° C. to form a dimensionally stable CRP panel. The pyrolysis took place at 800° C. in a pyrolysis oven under inert gas. The subsequent silicizing was carried out under a vacuum at approximately 1600° C. with a liquid silicon melt. The resulting C/SiC body was cooled down to room temperature.

The resulting body displayed a three-point bending strength of approximately 107 MPa with an elongation of 0.42%.

Figure 3:
FIG. 3 is a photo of a porous moulding containing the reinforcing fibres according to the invention, after pyrolysis and before infiltration with liquid silicon.
Figure 4:
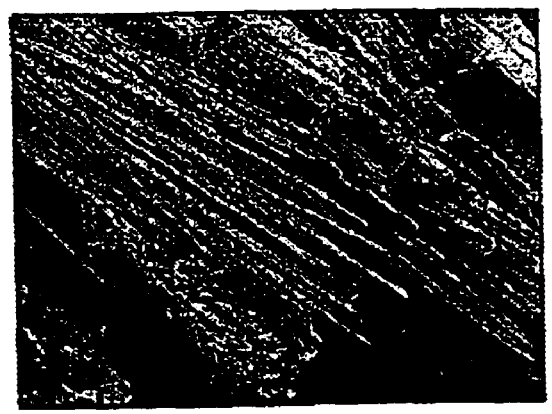
FIG. 4 is a scanning-electron-microscopic photo of the rupture surface of a C/SiC moulding containing the reinforcing fibres according to the invention after the three-point bending test.

FIG. 3 shows a panel produced according to exemplary embodiment 1 in the C/C state, that is after pyrolysing of the green compact, but before the infiltration with liquid silicon. FIG. 4 shows the rupture location of a C/SiC body produced according to exemplary embodiment 1 by infiltration with liquid silicon from the porous moulding shown in FIG. 3. It can be clearly seen that the reinforcing fibres remain intact, that is to say have not been attacked by the liquid silicon. The fibre pullout effect can be clearly seen.

While the above detailed description describes the preferred embodiment of the present invention, the invention is susceptible to modification, variation and alteration without deviating from the scope and fair meaning of the subjoined claims.

What is claimed is:

1. A reinforcing fiber of carbon, nitrogen, boron, silicon, metal, or glass for fiber composite materials, comprising:
   a core;
   at least one coating layer on said core; and
   a binder layer,
   wherein said at least one coating layer comprises a material selected from the group consisting of pyrolytic carbon, pitch, and at least one sugar; and
   said binder layer is pyrolizable.

2. A reinforcing fiber according to claim 1, wherein said coating layer is a pyrolytic dip coating.

3. A reinforcing fiber according to claim 1, wherein said coating is selected from the group consisting of a layer of pitch and a layer of pyrolytic carbon deposited from the gas phase.

4. A reinforcing fiber according to claim 1, wherein said coating layer is obtained by CVD coating using hydrocarbons.

5. A reinforcing fiber according to claim 4, wherein said hydrocarbon is methane.

6. A reinforcing fiber according to claim 1, wherein said core is selected from the group consisting of carbon fiber and silicon-carbide fiber.

7. A reinforcing fiber according to claim 1, wherein said coating layer is approximately 100 to 300 nm thick, or said binder layer is approximately 200 to 800 nm thick.

8. A fiber strand comprising at least two reinforcing fibers according to claim 1.

9. A fiber strand for composite materials, comprising reinforcing fibers of carbon, nitrogen, boron, silicon, metal, or glass, wherein each of said reinforcing fibers comprises at least one pyrolytic carbon coating provided under and a pyrolizable binder.

10. A fiber strand according to claim 9, wherein said pyrolytic carbon coating is a pyrolytic dip coating.

11. A fiber strand according to claim 10, wherein said pyrolytic dip coating is pitch or a layer of pyrolytic carbon deposited from the gas phase.

12. A fiber strand according to claim 10, wherein said pyrolytic carbon coating is obtained by CVD coating using hydrocarbons.

13. A fiber strand according to claim 12, wherein said hydrocarbon is methane.

14. A fiber strand according to claim 9, wherein said pyrolytic carbon coating is approximately 100 to 300 nm thick, or said pyrolizable binder is approximately 200 to 800 nm thick.

15. A fiber strand according to claim 9, wherein said reinforcing fibers are carbon fibers or silicon-carbide fibers.

16. A fiber strand according to claim 9, wherein the fiber strand comprises approximately 1,000 to 14,000 individual reinforcing fibers.

17. A fiber strand according to claim 9, wherein said individual reinforcing fibers comprise an average diameter of approximately 5 to 10 $\mu$m.

18. A fiber strand according to claim 9, wherein said individual reinforcing fibers comprise a length of approximately 10 to 30 mm.

19. A fiber composite material comprising reinforcing fibers, according to claim 1, embedded in a SiC-based matrix.

20. A fiber composite material comprising fiber strands, according to claim 9, embedded in a SiC-based matrix.

21. A fiber composite material according to claim 19, wherein the proportional content of said reinforcing fibers is at least 10% of the total fiber volume.

22. A fiber composite material according to claim 19, wherein the proportional content of said reinforcing fibers is 40% of the total fiber volume.

23. A fiber composite material according to claim 20, wherein the proportional content of said fiber strands is at least 10% of the total fiber volume.

24. A fiber composite material according to claim 20, wherein the proportional content of said fiber strands is 40% of the total fiber volume.

* * * * *